(12) United States Patent
Kirkby

(10) Patent No.: US 6,487,194 B1
(45) Date of Patent: Nov. 26, 2002

(54) COMMUNICATIONS NETWORK

(75) Inventor: Paul Anthony Kirkby, Old Harlow (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/089,728

(22) Filed: Jun. 3, 1998

(30) Foreign Application Priority Data

Jun. 4, 1997 (GB) .............................................. 9711548

(51) Int. Cl.[7] .............................................. H04L 12/28
(52) U.S. Cl. ...................................... 370/351; 370/389
(58) Field of Search .................................. 370/351, 252, 370/392, 394, 395.31, 230, 231, 235, 353, 356, 389, 397, 399, 400–406, 409, 471; 375/150, 152, 226, 283, 279, 329

(56) References Cited

U.S. PATENT DOCUMENTS

| | | | | |
|---|---|---|---|---|
| 4,847,869 A | * | 7/1989 | Labedz et al. .............. | 375/331 |
| 5,656,971 A | * | 8/1997 | Gotoh ......................... | 329/308 |
| 5,703,879 A | * | 12/1997 | Proctor et al. ............... | 370/398 |
| 5,740,346 A | * | 4/1998 | Wicki et al. .................. | 714/22 |
| 5,870,425 A | * | 2/1999 | Piaget et al. ................. | 375/147 |
| 5,923,654 A | * | 7/1999 | Schnell ........................ | 370/390 |
| 6,115,373 A | * | 9/2000 | Lea ............................. | 370/355 |
| 6,122,327 A | * | 9/2000 | Watanabe et al. ........... | 375/316 |

* cited by examiner

*Primary Examiner*—Douglas Olms
*Assistant Examiner*—Phirin Sam
(74) *Attorney, Agent, or Firm*—Lee, Mann, Smith, McWilliams, Sweeney & Ohlson

(57) ABSTRACT

A communication network with a set of nodes each arranged to extract signals received on orthogonal input paths when there is a predetermined correlation between them, and to retransmit the signals on orthogonal output paths when the predetermined correlation is absent. Each node is further arranged to launch signals intended for a particular destination node on orthogonal paths with a phase difference such that the signals arrive at the destination node with the predetermined correlation. Thus local processing of the signals is sufficient to extract a signal intended for a particular node. There is no need for centralized control or for the separate transmission of signaling data.

6 Claims, 4 Drawing Sheets

COMMUNICATIONS NETWORK

This invention relates to telecommunications networks and in particular to methods and apparatus for the transmission of traffic to a desired destination.

BACKGROUND OF THE INVENTION

Conventional telecommunications networks comprise a number of nodes interconnected by transmission paths. A key process in all such networks is that of traffic routing to ensure that signals launched from a network node are transmitted, i.e. correctly routed to a desired destination node. Current techniques for achieving this routing include the use of signalling channels to set up connections or virtual connections across the network, or the use of packet techniques in which each packet has a header containing information from which the destination can be determined. In order to facilitate the routing process, each network node is provided with routing tables from which the correct paths to other network nodes can be determined for traffic arriving at that node. As communications networks increase in size and in their traffic handling capacity, the traffic routing requirement is placing an increasing computational burden on the network operator.

SUMMARY OF THE INVENTION

An object of the invention is to minimise or to overcome the above disadvantage.

A further object of the invention is to provide an improved arrangement and method for routing traffic in a communications network.

According to a first aspect of the invention there is provided a communications network, having a plurality of nodes each arranged to extract signals received on orthogonal input paths when there is a predetermined correlation between them, and to retransmit the signals on orthogonal output paths when the predetermined correlation does not exist, each node being further arranged to launch signals intended for a particular other node, on orthogonal paths and with a phase difference such that the signals arrive at the node for which they are intended with the predetermined correlation.

According to another aspect of the invention there is provided a communications network as claimed in claim 1, wherein each node is arranged to analyse data to be transmitted over the network into a plurality of signals (LAPAFs) which are logically analogous to probability amplitude functions (PAFs) to launch in said orthogonal directions, and is arranged to combine probability functions received on orthogonal input paths such that at the intended node the data is reconstructed and at other nodes no signal is constructed.

The correlated extracted signal can be used either to set a network switch position or as a message in its own right.

Local processing of the signals is sufficient to extract a signal intended for a particular node. There is no need for centralised control or the separate transmission of signalling data.

Advantageously, the signals comprise complex signals that are resolved into their orthogonal real and imaginary parts for transmission and are reconstituted at the desired receiving node.

The transmitted signals represent an instantaneous envelope of the cell or bit rate of the information represented by the signal. Typically, the total of the instantaneous cell rates at each part of the network is equal to the pre-assigned capacity for that group of information envelope flows. These groups of information flows can be arranged in a hierarchy so that the summed ate of information flow envelopes is equal to the transmission capacity of each network link.

Preferably, local conservation is applied to the real and imaginary signal components so as to ensure global conservation of information flows. Thus, no flow need be terminated except at the desired exit node.

In a preferred form, each node is arranged to analyse data to be transmitted over the network into a plurality of signals (LAPAFs) which are logically analogous to probability amplitude functions (PAFs) to launch in said orthogonal directions, and is arranged to combine LAPAFs received on orthogonal input paths such that at the intended node the data is reconstructed and at other nodes no signal is constructed. These LAPAFs obey global, and local conservation rules in a manner analogous to PAFs in quantum mechanics. The LAPFs can also represent the instantaneous cell rate and/or bit rate information flow envelope for each information stream.

In that form, one function may be a digital signal representing the complex conjugate of a LAPAF launched in an orthogonal direction.

Most conveniently, the delays in transmission paths between adjacent nodes may each be a respective integer multiple of one of a set of predetermined fixed units. These may be geometrically related to the structure of the network, for example 1, $\sqrt{2}$ and $\sqrt{5}$.

BRIEF DESCRIPTION OF THE DRAWINGS

An embodiment of the invention will now be described, by way of example, with reference to the accompanying drawings, in which.

DESCRIPTION OF PREFERRED EMBODIMENT

Figure 1:
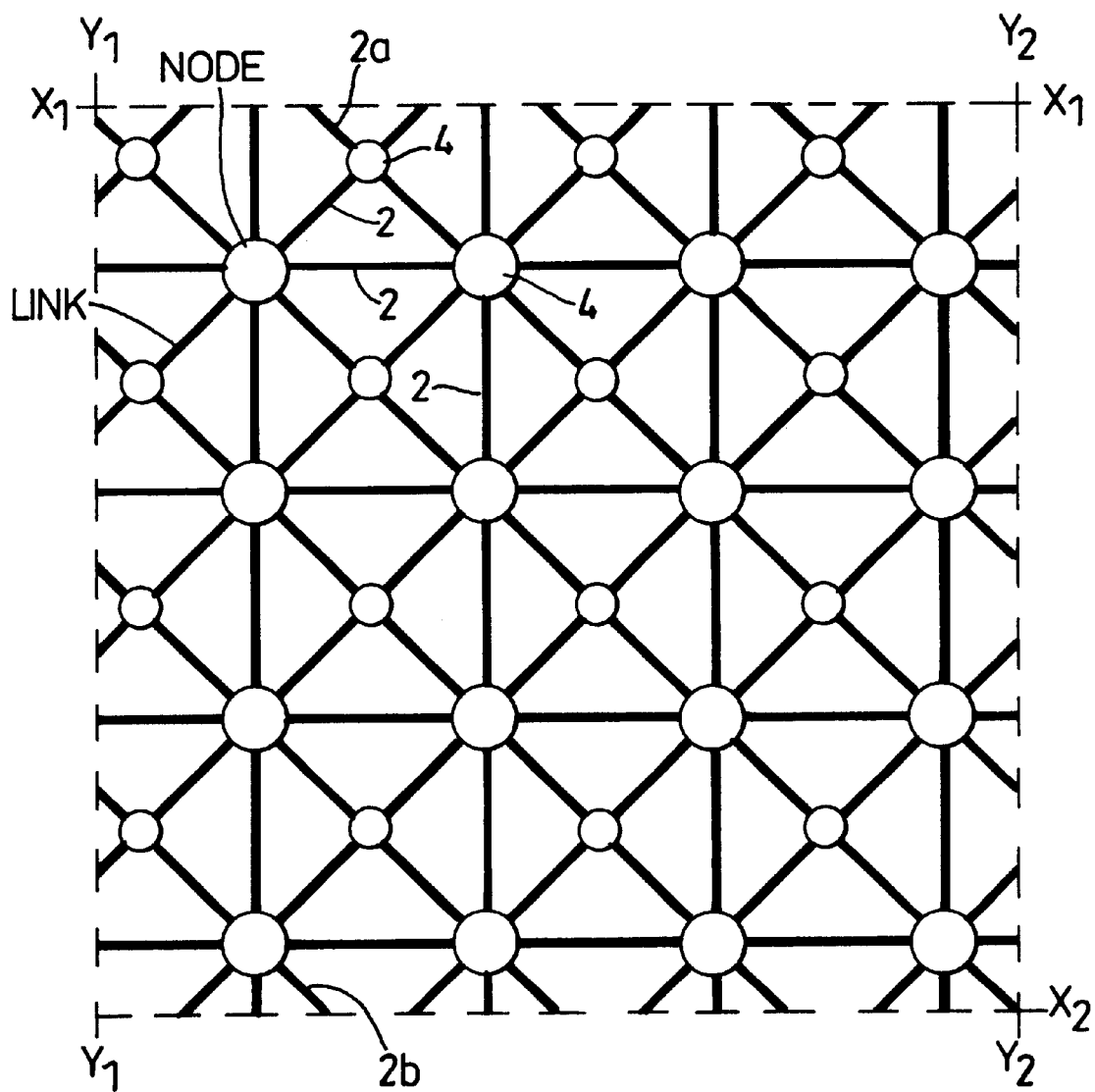
FIG. 1 is a schematic diagram of a network embodying the invention.

The network shown in FIG. 1 comprises a mesh arrangement of links 2 and nodes 4. All the links have respective transmission delays which are each a multiple of a predetermined unit, e.g. are equal. This is achieved either due to their length and the speed of light therethrough, or by padding to adjust the delay to the desired value.

Topologically, in delay space the network lies on the surface of a 4-dimensional sphere. Thus the network joints itself at broken lines $X_1$—$X_1$ and $X_2$—$X_2$ which are in the same place. Thus at the edge of the diagram a link 2 is illustrated as two parts 2a and 2b which are, in reality one unbroken link. Similarly, the network joins itself along lines $Y_1$—$Y_1$ and $Y_2$—$Y_2$ which also correspond in space.

Figure 2:
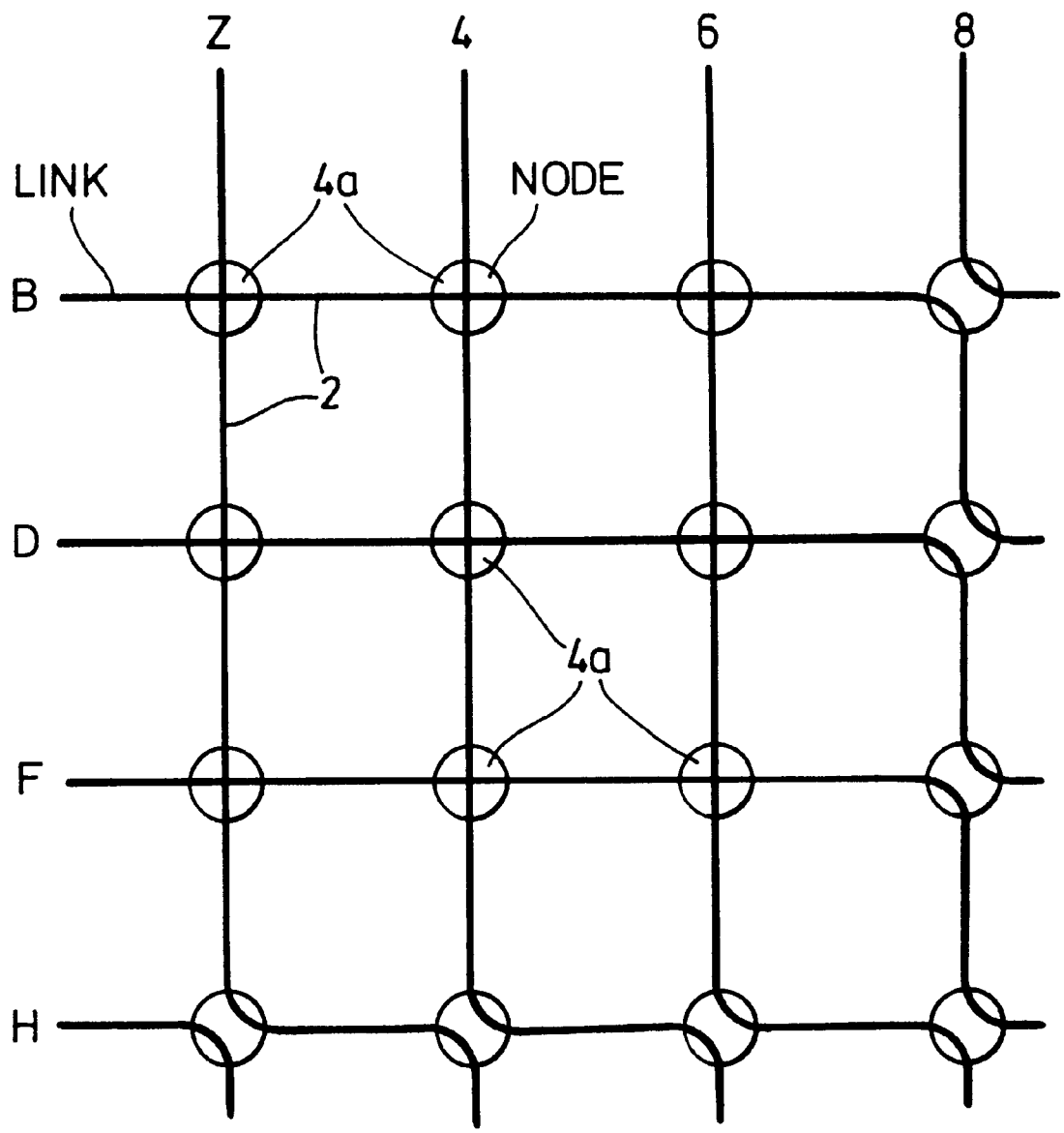
FIG. 2 is a schematic view of a first subnetwork in the network of FIG. 1.

The network comprises two subnetworks one of which is illustrated in FIG. 2. this has an array of sixteen nodes 4a connected by a lattice of links 2. The nodes are arranged in rows B, D, F and H and columns 2, 4, 6 and 8. Thus an individual node 4a can be identified by its coordinates in the lattice e.g. F2. The nodes are set so that a signal launched from one node can visit all nodes in the subnetwork unless extracted. In one arrangement which is shown in FIG. 2, the nodes in row H and column 8 are set in the bar configuration. The other nodes are set in the cross configuration. Signals launched from, say, node F2 on the subnetwork in orthogonal directions arrive at all nodes in orthogonal directions.

Figure 3:
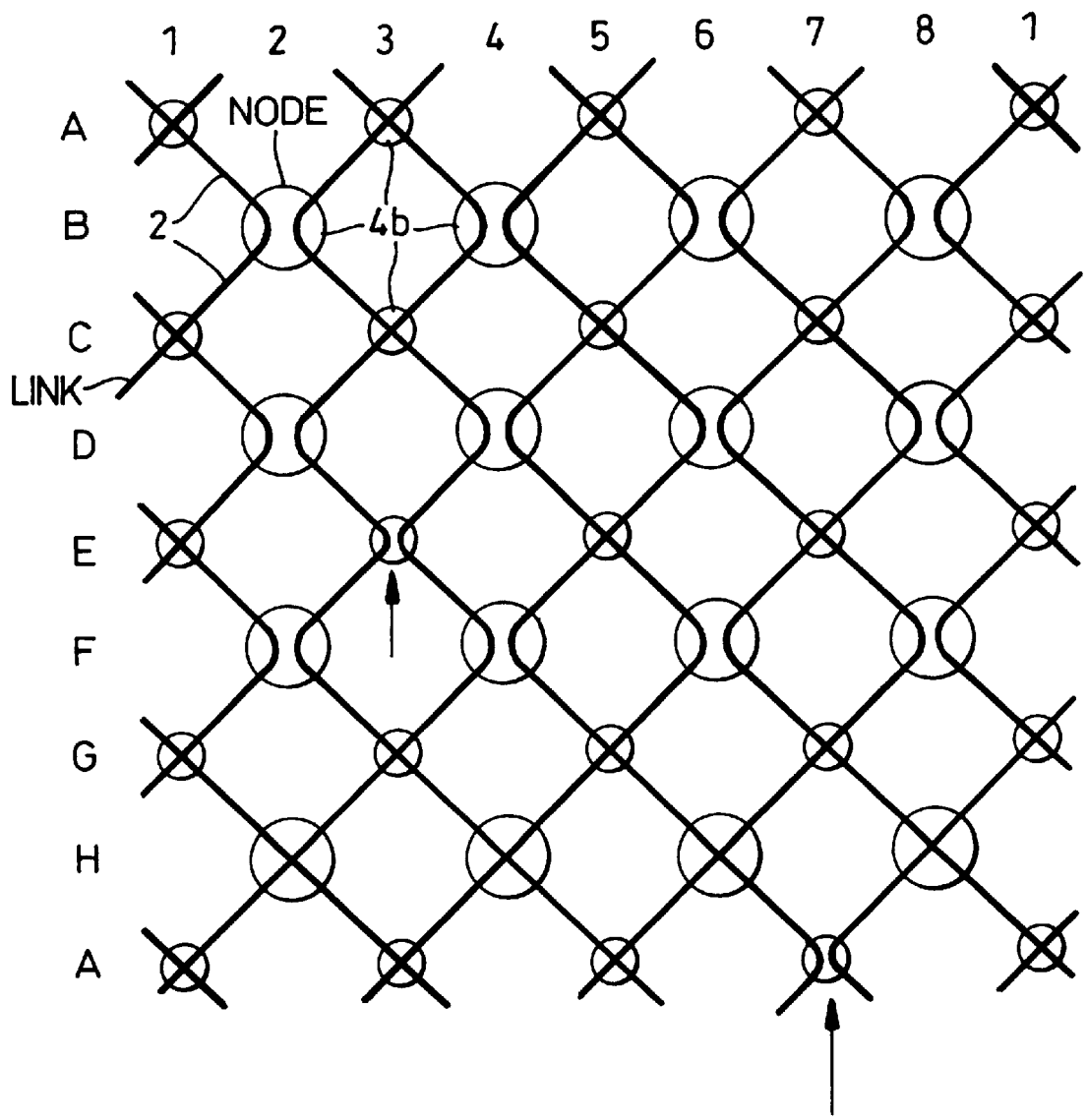
FIG. 3 is a schematic view of a second subnetwork in the network of FIG. 2, which second subnetwork overlies the first.

In the overlay subnetwork shown in FIG. 3, nodes 4b are arranged in an array of rows A–H, row A being repeated, and columns 1–8, column 1 being repeated. The links 2 are laid on the diagonals. An example of a pattern of bar and cross configurations at the nodes is shown which would allow signals launched in orthogonal directions from any node in the subnetwork to arrive in orthogonal directions at all other nodes corresponding to those in FIG. 2 unless extracted.

Signals launched in orthogonal directions in the subnetwork of FIG. 3 are also orthogonal to signals launched from the corresponding node in the subnetwork of FIG. 2.

Data to be transmitted from one node corresponding to the subnodes in FIG. 2 across the network to a particular other such subnode node is analysed into a plurality of probability amplitude functions which are launched in orthogonal directions on the network. As the network effectively provides four orthogonal directions, a set of signals comprising pair of probability amplitude functions each with its complex conjugate can be launched from a node. Each of the nodes corresponding to the subnodes in FIG. 2 combines the signals arriving at its orthogonal input ports so that, when the pair of probability amplitude functions arrive with their complex conjugates in a predetermined phase relationship, e.g. in phase with one another, the original data is recreated. The sending node launches the signals with such phase differences as to accommodate the different path lengths so that the set arrives in the predetermined phase relationship only at the intended destination node which thus recreates the original data. At all other nodes except that from which the set is launched, the signals are not in the predetermined phase relationship and no signal is created.

When a node recognises that a signal is present it prevents retransmission.

If the node which launched the set later receives it, that indicates the set was not received.

Defining a frame as the time taken for a signal launched on the network to visit all of the nodes corresponding to the subnodes of FIG. 2, the position or phase of a signal arriving at a node indicates which node launched it so that two way communication can be established.

Figure 4:
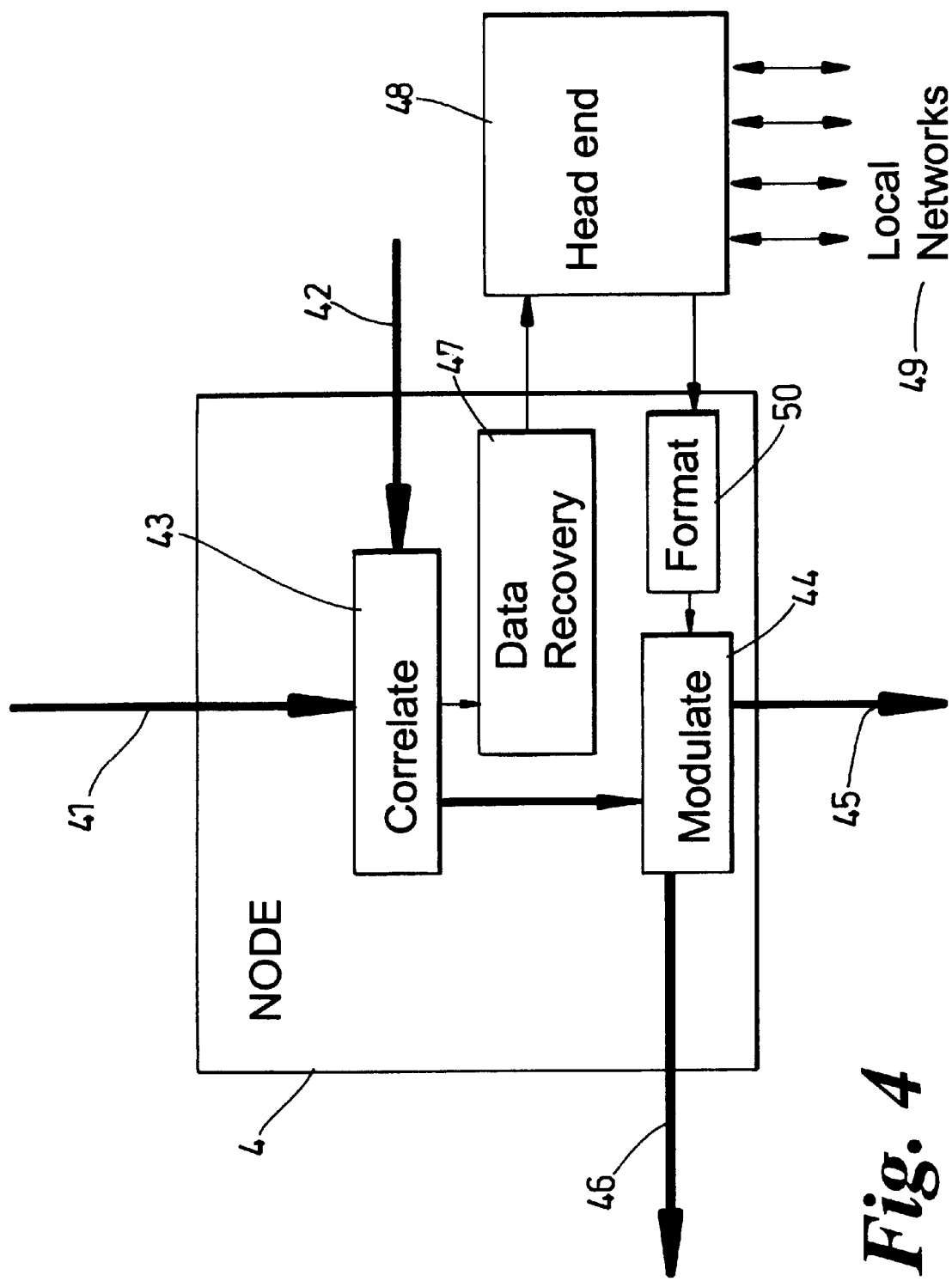
FIG. 4 is a schematic diagram of a network node.

Referring now to FIG. 4, this depicts in schematic form the general construction of a node for use in the network of FIGS. 1 to 3. Signals arriving at the node 4 on two orthogonal paths 41 and 42 are fed to a correlator 43 which determines whether or not the predetermined phase relationship exists between the signals on those paths. Where no such phase relationship is found to be present, i.e. the signals are not intended for that node, the correlator allows the signals to pass to modulator 44 for onward retransmission to other system nodes on orthogonal paths 45 and 46. If however, the correlator determines that the desired phase relationship is present, i.e. the signals are intended for that particular node, the signals are not retransmitted but are fed to data recovery circuit 47 which re-creates the original data for output e.g. to a local head end 48 coupled to one or more local networks 49. The head end also feeds local ingress traffic into the node 4 via data formatter 50 to the modulator 44 whereby this ingress traffic is modulated on to the signal passing through the node for output transmission on paths 45 and 46.

In a preferred embodiment, a digital binary signal comprising ones and zeros is modulated by multiplication with its flow envelope to provide a rotating complex vector. The resultant complex signal is then resolved into its four sub-components comprising real positive R+), real negative (R–), imaginary positive (I+) and imaginary negative (I–). The real and imaginary components form the orthogonal parts of the signal which, when arriving in the appropriate phase relationship at the desired network node, can be recombined to recover the original data.

In a preferred embodiment, the arrangement provides a distributed control system that controls cell rate in such a way as to ensure no cell overflow. It uses dynamic pricing to fill all the network capacity with labelled cells. Essentially all cell flows are analysed on to their Fourier (or Wavelet) components. Each stream of information is resolved into four sub-components and the most significant bit (or bit pair) on the cell 'header' labels the cell as real positive, real negative, imagery positive or imaginary negative. The cell would also be labelled with the envelope frequency The envelope frequency is the rate at which the cell rate for this stream sub component oscillates from zero cell rate to its maximum cell rate. Another parameter on the cell is the maximum cell rate. All the substreams have a cell rate that can be characterised by a raised sine or raised cosine form, and a frequency of cell rate variation that is synchronised with the rest of the global network. In all places in the network a total cell rate is defined and the total of all the cell rates is equal to this value. However not all the cells necessarily contain useful information. If the demand pattern of the network does not match the capacity pattern (which in general it won't) then there are bound to be empty cells. Nevertheless these empty cells are labelled as such and can be instantly used by nodes to transport best effort traffic.

In this arrangement any total cell rate between zero and C (the peak capacity in cells/sec) that forms a cell rate 'profile' (cell rate vs time) can be analysed into its Fourier components. These components will all have an amplitude (peak cell rate) and a frequency (time between successive peak cell rates). If the header in the cell contains the Fourier component structure of the cell stream at that instant then, until some component changes, the stream profile is precisely defined. As discussed above, the actual flow cell rates of each of the four sub-flows representing the real and imaginary components is of raised cosine form with a time period T. This time period can be used to represent the degree of time tolerance of the signal encapsulated within the envelope. At any instance, the sum of the sub-flows is equal to the total steady flow rate. Also at any instant, only two orthogonal components, one real and one imaginary, exist so that the flow can be represented by a rotating complex vector of constant magnitude. This vector is an example of a LAPAF.

The time varying flow components can be controlled using, for example, a dynamic flow control algorithm set so that the sum of the flows at any instant at any point of the network is equal to or less than the available or assigned flow capacity at that point. Flows can be aggregated groups with the same time period T.

When there are many such flows in the network, then conservation rules applied at the network nodes to the sums and products of the flow components, combined with correlation for data extraction and modulation for imposing new or ingress data on the set of flows, enables information to be transmitted efficiently from source to destination within the network without loss of data in transit.

It will be understood that the above description of a preferred embodiment is given by way of example only and that various modifications may be made by those skilled in the art without departing from the spirit and scope of the invention.

What is claimed is:

1. A communications network, having plurality of nodes each arranged to extract signals received on orthogonal input paths when there is a predetermined correlation between them, and to retransmit the signals on orthogonal output paths when the predetermined correlation does not exist, each node being further arranged to launch signals intended for a particular other node, on orthogonal paths and with phase difference such that the signals arrive at the node for which they are intended with the predetermined correlation, wherein each node is arranged to analyse data to be transmitted over the network into a plurality of signals (LAPAFs) which signals are logically analogous to probability amplitude functions, to be launched on said orthogonal output paths, and wherein each node is arranged to combine probability functions received on orthogonal input paths such that, at the intended node for the reception of that data, the received signals are reconstructed, and at other nodes no signal is reconstructed.

2. A communications network as claimed in claim 1 wherein the transmitted signals represent an instantaneous envelope of the cell or bit rate of the information stream represented by the signal.

3. A communications network as claimed in claim 2, wherein the total of the instantaneous cell rates at each part of the network is equal to the pre-assigned capacity for that group of information envelope flows.

4. A communications network as claimed in claim 3, wherein one function is a digital signal representing the complex conjugate of a LAPAF launched in an orthogonal direction.

5. A communications network as claimed in claim 4, wherein the delays in transmission paths between adjacent nodes are each a respective integer multiple of one of a set of predetermined fixed units.

6. A method of operating a communications network having a plurality of nodes each arranged to receive communications signals on respective orthogonal input paths, the method comprising;

at one of said nodes, receiving the communications signals on said orthogonal paths;

determining whether a predetermined correlation exists between the signals received on said orthogonal input paths;

where said correlation is detected, recovering and extracting the communications signal at the node; and where no correlation is detected, re-transmitting the received signals on first and second output paths from the node, and wherein each node is arranged to analyse data to be transmitted over the network into a plurality of signals (LAPAFs), which signals are logically analogues to probability amplitude functions, to be launched on said orthogonal output paths, and wherein each node is arranged to combine probability functions received on orthogonal input paths such that at the intended node for the reception of that data, the received signals are reconstructed, and at other nodes no signal is reconstructed.

* * * * *